(Model.)
F. H. DEXTER.
MECHANICAL MOVEMENT.
No. 273,040. Patented Feb. 27, 1883.
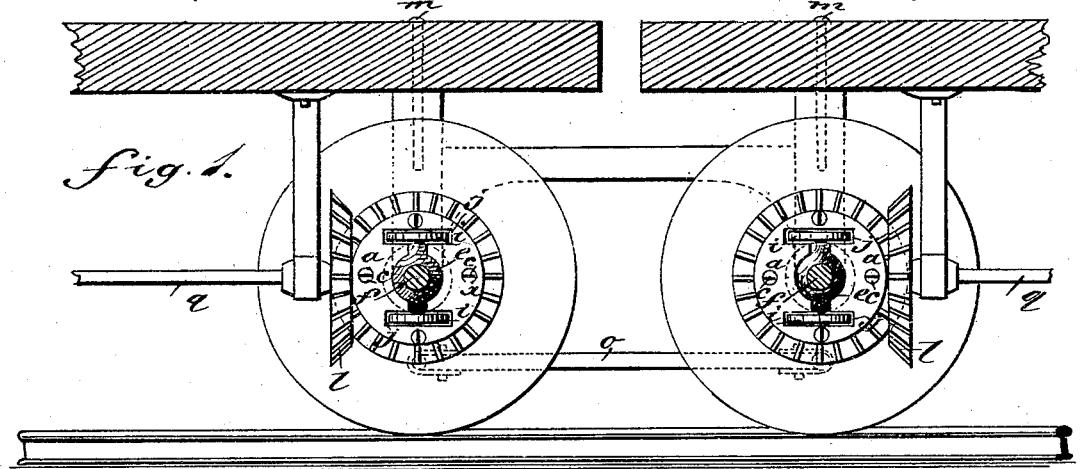
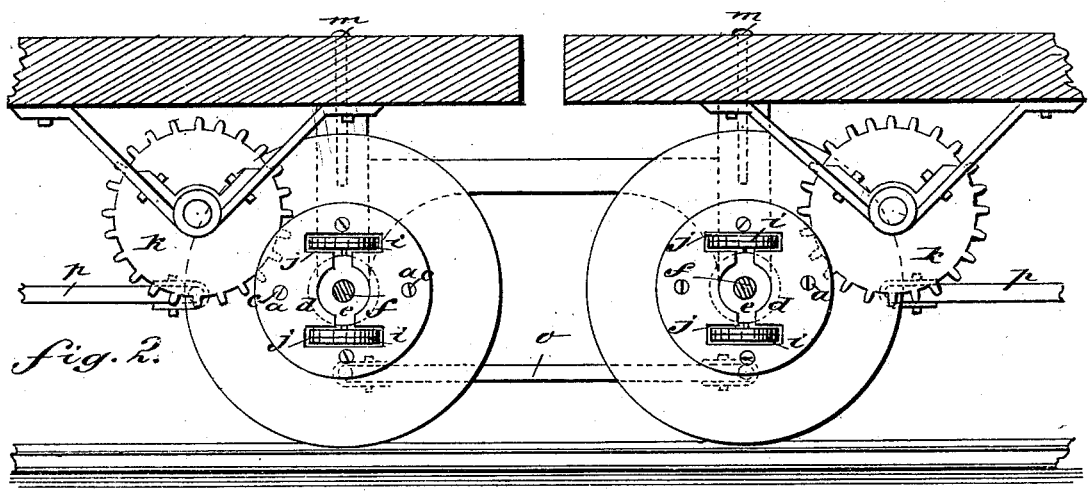
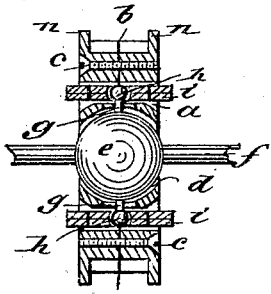
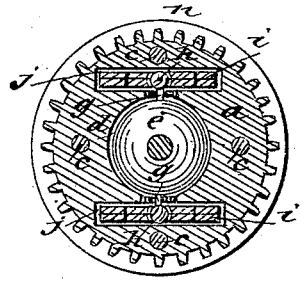
WITNESSES:
Otto Beyer
C. Sedgwick
INVENTOR:
F. H. Dexter
BY Munn & Co.
ATTORNEYS.

UNITED STATES PATENT OFFICE.

FREDERICK H. DEXTER, OF WARDSBOROUGH, VERMONT.

MECHANICAL MOVEMENT.

SPECIFICATION forming part of Letters Patent No. 273,040, dated February 27, 1883.

Application filed August 24, 1882. (Model.)

*To all whom it may concern:*

Be it known that I, FREDERICK H. DEXTER, of Wardsborough, in the county of Windham and State of Vermont, have invented a new and Improved Mechanical Movement, of which the following is a full, clear, and exact description.

My invention consists in the peculiar construction and arrangement of parts for connecting the driving-wheel to its shaft, whereby the wheel is permitted to vibrate with reference to the shaft and the shaft to vibrate with reference to the wheel without impairing the efficiency of the wheel for driving.

The device is intended more particularly for transferring the driving-power from one car to another of a train of cars to utilize the traction of the different cars, the arrangement being such that the driving-power may be so transferred without obstruction by the lateral and vertical divergence of the cars on curves and grades; but it is useful for transferring power at any angle of the wheel to the shaft and for other purposes, as hereinafter fully described.

Reference is to be had to the accompanying drawings, forming part of this specification, in which similar letters of reference indicate corresponding parts in all the figures.

Figure 1 is a longitudinal section of the ends of a couple of cars geared according to my invention, as when bevel-wheels are employed. Fig. 2 is a similar view with spur-gears. Fig. 3 is a section of the ball-joint wheel in the plane of the shaft, and Fig. 4 is a section of the wheel transversely of the shaft.

The wheel consists of two parts, $a$, which join together at the line $b$ transversely of the shaft, being fastened by bolts $c$, and having a ball-socket, $d$, at the center, in which a ball, $e$, is located, said ball being securely attached to the shaft $f$, and it has two studs, $g$, projecting from opposite points of its circumference in the plane of the wheel $a$, said studs terminating in smaller balls, $h$, which are socketed in the disks $i$, lodged in the slots $j$ of the wheel $a$. The ball is connected with the wheel by the disks $i$, arranged in the slots $j$ therein for driving purposes, the wheel or the shaft being the driver. The ball and the disks are free to vibrate in wheel $a$, as on the studs $g$ $h$ for pivots, and said studs and the disks can vibrate laterally in the wheel, thus making a substantial ball-and-socket connection of the wheel with the shaft, affording universal action of the one with reference to the other, so that with any suitable means to maintain the wheel $a$ in the plane of the connecting-wheel $k$ or in proper connection with wheel $l$ when the car turns on the center, $m$, power may be readily transmitted from one car to another, using either bevel or spur wheels.

When spur-wheels are used the flanges $n$ of the ball-jointed wheel $a$ may serve to maintain it in the plane of wheel $k$; but in the case of the bevel-wheels some other means will be required.

In this arrangement for driving cars the ends of the cars will be jointed to the ends of the truck, respectively, as at $m$—that is to say, they will be jointed over the center of ball-joint wheel on the center of axle or near to it, having the ball-jointed driving-wheel to vibrate in unison with the vibrations of said ball-joint wheel, and the power will be transmitted from one axle to the other by the connecting-bars $o$ or other suitable means.

If spur transmitting-gears $k$ are used, connecting-bars $p$ may be used with them, or other means, as desired, and when the bevel-wheels $l$ are employed line-shafts $q$ will be preferred.

Having thus fully described my invention, I claim as new and desire to secure by Letters Patent—

1. The combination, with a ball-and-socket-jointed wheel, $a$, and shaft $f$, of a ball on the shaft $f$, located in a socket in the wheel and having ball-studs $g$ $h$, and the disks $i$, located in the slots $j$ of the wheel and connected with said studs, substantially as described.

2. The combination, with the wheel $a$, made in two parts and provided with the socket $d$, slot $j$, and the flanges $n$, of the shaft $f$, the ball $e$, the studs $g$ $h$, and the sliding disks $i$, substantially as and for the purpose set forth.

3. In gear for transmitting power from one car to another of a train, a truck having a car pivoted to each end, and each car being geared with the axle of its end of the truck by a wheel universally pivoted to said axle, and suitable connecting gears, substantially as described.

FREDERICK H. DEXTER.

Witnesses:
J. G. EDDY,
GERALD B. KIRWAN.